(12) United States Patent
Cowan

(10) Patent No.: US 7,723,271 B2
(45) Date of Patent: May 25, 2010

(54) METHOD FOR SEALING PIPE IN A WELL

(75) Inventor: Kenneth Michael Cowan, Sugar land, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/645,850

(22) Filed: Dec. 23, 2009

(65) Prior Publication Data

US 2010/0096133 A1    Apr. 22, 2010

Related U.S. Application Data

(62) Division of application No. 11/778,771, filed on Jul. 17, 2007, now abandoned.

(60) Provisional application No. 60/807,771, filed on Jul. 19, 2006.

(51) Int. Cl.
*C09K 8/44* (2006.01)
*E21B 21/00* (2006.01)
*E21B 33/13* (2006.01)

(52) U.S. Cl. ................ 507/118; 166/295; 166/302; 166/387; 507/119; 507/219; 507/221; 507/224

(58) Field of Classification Search ................ 507/118, 507/119, 219, 221, 224; 166/295, 302, 387
See application file for complete search history.

(56) References Cited

U.S. PATENT DOCUMENTS

| 4,500,577 | A | * | 2/1985 | Satake et al. ................ 138/143 |
| 4,716,965 | A | | 1/1988 | Bol et al. ..................... 166/292 |
| 5,151,131 | A | | 9/1992 | Burkhalter et al. .......... 106/822 |
| 5,301,754 | A | | 4/1994 | Cowan et al. ............... 166/295 |
| 5,307,877 | A | | 5/1994 | Cowan et al. ............... 166/295 |
| 5,325,922 | A | | 7/1994 | Cowan et al. ............... 166/293 |
| 5,332,040 | A | | 7/1994 | Nahm et al. ................ 166/293 |
| 5,458,195 | A | | 10/1995 | Totten et al. ................ 166/293 |
| 2004/0033905 | A1 | | 2/2004 | Shinbach et al. ............ 507/100 |

* cited by examiner

*Primary Examiner*—Timothy J. Kugel

(57) ABSTRACT

A method for improving bonding and sealing in a well, comprising providing a wellbore, providing a pipe, coating an outside surface of the pipe with an adhesive thermoplastic resin, running the coated pipe into the wellbore, and causing the temperature of said wellbore to increase to a temperature greater than a melting temperature of said adhesive thermoplastic resin.

10 Claims, No Drawings

METHOD FOR SEALING PIPE IN A WELL

CROSS-REFERENCE TO RELATED APPLICATION

This application is a divisional of U.S. application Ser. No. 11/778,771, filed Jul. 17, 2007, now abandoned, which claims the benefit of U.S. Provisional Application No. 60/807,771 filed Jul. 19, 2006, both of which are incorporated herein by reference.

FIELD OF THE INVENTION

The present invention relates to improved well sealing methods.

BACKGROUND OF THE INVENTION

The practice of cementing wells to provide isolation between exposed formations along a wellbore has been used in the drilling industry for a century. It is estimated over a billion sacks of cement have been used for this purpose. The process of primary and remedial cementing has been extensively studied over the past six decades and many improvements have been made which increase the effectiveness of the process in order to achieve zonal isolation. However, there are several fundamental limitations in the current state of the art of cementing wells that limit success in providing the most effective zonal isolation.

One limitation is that it is difficult to completely remove or displace all the drilling fluid (or other fluid) in the wellbore with cement slurry when placing the cement during the primary cementing process. Another limitation is that the cement does not bond (or adhere) satisfactorily to casing surfaces and drilling fluid filter cake or residue. Furthermore, changes in the stress state of the wellbore during completion of drilling and throughout the productive life of the well can damage the cement bond/seal to cement and formation. These changes in the stress state of the wellbore may be the result of thermal changes (temperature) or pressure changes (for example, displacing a heavy fluid in the casing with a lighter fluid during completion of the well or additional deepening of the well, or changes in formation pressures or changes in annular pressures).

It is known in the art to include additives to prevent fluid loss in cement compositions. U.S. Pat. No. 4,716,965 discloses an improvement in a cementing process for preventing fluid migration between the casing and cement in a situation where a casing is suspended within a well and a slurry of cement is flowed into the space between the casing and the borehole wall and allowed to harden, comprising: surrounding at least one portion of the outer surface of the casing with a self-supporting sheath of an elastomeric foam comprising alternately arranged layers of a closed cell polyurethane foam and a closed cell polyethylene foam which, together, are capable of remaining resilient and retaining the structural integrity of the sheath after compression by the hydrostatic pressure of a slurry of cement; inflowing the cement slurry into the borehole around the casing and sheath; and allowing the cement to harden with the resilient tendency toward expansion of the elastomeric foam ensuring good adhesion of the sheath to both the casing and cement.

U.S. Pat. No. 5,151,131 discloses a liquid fluid loss control additive for an aqueous well cement composition, said additive including an organophilic clay suspending agent present in an amount in the range of from 0.5 to about 8 percent by weight of said liquid hydrocarbon, a surfactant present in said additive in an amount in the range of from about 0.5 to about 8 percent by weight, and at least one hydrophilic polymer present in an amount in the range of from about 40 to about 150 percent by weight of said liquid hydrocarbon.

U.S. Pat. No. 5,458,195 discloses an improved cementious composition which can include drilling fluid as a component and methods of cementing wells utilizing such compositions, said cementious composition including a drilling fluid present in an amount up to about 70% by volume, and a hardenable resinous material selected from the group consisting of vernonia oil, epoxidized linseed oil or soy oil, an acrylic resinous material, an epoxy resinous material, a phenolic resinous material and mixtures of said resinous materials present in said composition in an amount in the range of from about 1% to about 50% by weight of said cementious material or materials; and water present in said composition in an amount in the range of from about 20% to about 175% by weight of said cementious material.

In the current state of the art there are limitations on the effectiveness of cement slurries and drilling fluids that result in less than desirable adherence of cement to casing surfaces and drilling fluid cake or residue. Many of these problems could be effectively addressed by cementious compositions characterized by improved ductility and by cement slurries and drilling fluid formulations that afford better bonding, sealing and adhesion.

SUMMARY OF THE INVENTION

The present inventions include a method for improving bonding and sealing in a well, comprising providing a wellbore, providing a pipe, coating an outside surface of the pipe with an adhesive thermoplastic resin incorporated into a well fluid, running the coated pipe into the wellbore, and causing the temperature of said wellbore to increase to a temperature greater than a melting temperature of said adhesive thermoplastic resin.

DETAILED DESCRIPTION

Adhesive thermoplastic materials, commonly known as hot melt glues or hot melt adhesives, may be incorporated into drilling fluids, spotting fluids, and cement slurries, and applied to casings, equipment, and hardware to improve the sealing and bonding of the components of a well. Adhesive thermoplastic materials are commonly used in household hot melt glue adhesives and in tough resilient, non-abrasive elastomers and sealants. In the present invention adhesive thermoplastic materials are selected based upon melting point, thermal stability, material properties at well operating temperatures, well geothermal static temperature, circulating temperature of the wellbore, and zonal isolation requirements for the well.

Of particular interest are adhesive thermoplastic polymers or resins that have reactive chemical groups which promote adhesion and can react with components of the cement, unremoved drilling fluid, formation, and well casings to form a seal, repair a seal destroyed by stresses in the well, alter the material properties of the cement or any remaining drilling fluids in the wellbore, and to make the cement or other remaining fluids more resistant to damage under the stresses of well operating conditions.

The adhesive thermoplastic polymers or resins can be used to form sealants with drilling fluids and cement slurries; to alter the material properties of cements, in particular increasing ductility; to seal leaking connections in casing strings; to seal weak or highly permeable formations, and to heal loss circulation problems; or to seal microannuli between cement and casing(s).

Examples of suitable adhesive thermoplastics for use in the present invention include certain acrylic acid copolymers, and ionomers and salts thereof. Suitable copolymers include, but are not limited to, ethylene-acrylic acid copolymers, ethylene-methacrylic acid copolymers, ethylene-vinyl acetate copolymers, ethylene-vinylphosphonic acid copolymers and ionomers or salts of acid forms of acidic copolymers. By ionomer is meant organometal compositions having a metal attached to or interlocking (crosslinking) a polymer chain. Ionomers are prepared by neutralization of the carboxylic acid group of the copolymers, or partial neutralization with metal ions. Suitable salts include, but are not limited to salts of Group IA, IIA, or IIB of the Periodic Table. Specific examples include, but are not limited to sodium, calcium, magnesium, and zinc, or combinations thereof. Blends of materials may also be used to vary properties and performance of the materials to meet performance conditions.

Ionomers containing zinc, calcium, and magnesium are available under the tradename AcLyn® from Honeywell International, Inc. Single valent ionomers containing sodium, as well as zinc ionomers are available commercially under the tradename LOTEK from Exxon Mobil.

In addition to copolymers, homopolymers of high molecular weight acrylic acid (polyacrylic acid), methacrylic acid (polymethacrylic acid), vinyl phosphonic (polyvinyl phosphonic) or blended compounds such as polyethylene blended with acrylic, methacrylic, polyacrylic, polymethacrylic, vinyl phosphonic, or polyvinylphosphonic acids or ionomers thereof may form suitable sealants which fulfill the functions required.

Copolymers and ionomers are commercially available from a variety of sources. Ethylene acrylic acid copolymers are available from Honeywell (Allied Signal) under the product name A-C Copolymers®, from Dow under the general product name PRIMACOR®, and from DuPont under the general product name NUCREL®.

In addition to the copolymers and homopolymers above, blends of polyethylene with compounds such as acrylic, methacrylic, polyacrylic, polymethacrylic, vinyl phosphonic, polyvinylphosphonic acids, and ionomers and salts thereof, and combinations thereof may form suitable sealants which fulfill the functions required.

Copolymers and ionomers are generally supplied as pellets, beads, powders, granules, or prills. Sizes can be selected for particular conditions and the treating fluid may contain a mix of sizes for enhanced performance. Aqueous dispersions of the products may also be used in some situations.

In some applications it may be advantageous to utilize the copolymers in the form of a liquid dispersion. Liquid dispersions can also be used in the treatment mixture for suspension, variation of reactivity over a range of temperatures, and for small bridging particles. Heating up the copolymers and dropping them into solvent under high sheer makes dispersions. This has the effect of increasing the copolymer surface area by breaking up the copolymer and forming vast numbers of smaller particles, each having readily available reactive groups. The use of dispersions can provide fast reaction times because more —COOH groups are available for reaction. The particles in dispersion may be in the range of 0.03 microns to 0.3 microns. Suitable ethylene acrylic acid dispersions are available commercially under the tradename Michem® Prime 4983R, 4983-40R, and 4990R from Michelman, Inc.

The invention is not intended to be limited to particular cementious materials. Suitable cement compositions include, for example, but are not limited to hydraulic cements, high alumina cement, slag, fly ash, condensed silica fume with lime, gypsum cement, and mixtures of cementious materials. Examples of hydraulic cement include Portland cements of the various types identified in *API Specification for Materials and Testing for Well Cements*, API Spec. 10 of the American Petroleum Institute, which is incorporated herein by reference.

The drilling fluid or mud can be either a conventional drilling fluid, i.e., one not containing a cementious material, or it can be one already containing a cementitious material in a relatively small amount. The drilling fluid can be either a water-based fluid or an oil-based fluid. The term 'water-based fluid' is intended to encompass both fresh water muds and salt water-containing muds, whether made from seawater or brine, and other muds having water as the continuous phase including oil-in-water emulsions. In any event drilling fluid will generally contain at least one additive such as viscosifiers, thinners, dissolved salts, solids from the drilled formations, solid weighting agents to increase the fluid density, formation stabilizers to inhibit deleterious interaction between the drilling fluid and geologic formations, and additives to improve the lubricity of the drilling fluid. The teaching of U.S. Pat. No. 5,325,922 is incorporated by reference herein in the entirety.

The adhesive thermoplastic resins can also be incorporated into spotting fluids. Suitable spotting fluids should have a good lubricating effect and the ability to ensure good oil wetability of the surfaces of the drill pipe and of the walls of wells coming into contact with the drill pipe. Spotting fluids known in the art typically comprise hydrocarbon mixtures, often based on diesel oils or mineral oils. Emulsifiers and surfactants are typically added. The invention is not intended to be limited to any particular spotting fluids and those skilled in the art will see numerous possibilities.

A catalyst or initiator is useful in the application of the present invention. The use of catalysts and initiators is known in the art and the invention is not intended to be limited to any particular type. Suitable catalysts may include, for example, but not be limited to, free radical initiating catalysts or catalyst systems. Such catalysts may be organic peroxy-compounds such as benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di (2,4-dichlorobenzoyl) peroxide, diisobutyl peroxide, t-butyl perbenzoate, and t-butyl peracetate. The catalyst may be employed in total amounts from about 0.01 to about 50 weight percent based upon the weight of the polymerizable monomer. Other suitable catalysts may include strong acid catalysts such as sulfonic, or organic or mineral acids, such as, for example formic, boric, phosphoric, oxalic and acid salts of hexamethylenetetramine.

In some instances, it may be desirable to use a material which functions as a retarder along with the catalyst or activator due to the need for other effects brought about by the retarder. For instance, chromium lignosulfonate may be used as a thinner along with the activator even though it also functions as a retarder. Other suitable thinners include chrome-free lignosulfonate, lignite, sulfonated lignite, sulfonated styrene maleic-anhydride, sulfomethylated humic acid, naphthalene sulfonate, a blend of polyacrylate and polymethacrylate, an acrylamideacrylic acid copolymer, a phenol sulfonate, a naphthalene sulfonate, dodecylbenzene sulfonate, and mixtures thereof.

The selection of the proper adhesive thermoplastic material to improve bonding and sealing in well fluid in a particular situation requires two considerations. First, the material may be selected because it melts between the circulating temperature of the wellbore and the undisturbed geothermal temperature of the well. The material is incorporated into the cement slurry, drilling fluid, or spotting fluid, or on the outside of the casing string, and placed in the wellbore at a temperature less than the static or undisturbed geothermal temperature. After placement, the wellbore will heat up, melting the material and allowing it to fill unsealed areas and/or react to adhere to surfaces or to form an ionomer with metallic ions in the cement, drilling fluid and/or formation.

Secondly, for thermal recovery projects, or deep water wells where the well temperature of the formation is lower than the operating temperature of the well, a material may be selected because it will melt at a temperature between the undisturbed geothermal temperature of the well and the operating temperature of the well (or at/slightly below the operating temperature of the well). Hot injectants or products may be used to heat the well or parts of the well to temperatures above the natural, undisturbed geothermal static temperature of the formation. Three examples of this are:
  a. Steam injection wells—high temperature (250-650° F. or 120-350° C.) steam is injected through a well into a formation to mobilize thick oil or bitumen. The steam temperatures are greater than the natural temperatures of the formation.
  b. Thermal Conduction Wells—a wellbore is heated above its natural formation temperature by conduction of heat from a heated casing or non-cased wellbore. The casing or wellbore may be heated by electrical resistive heating, hot gas or steam circulation inside the casing or wellbore or downhole combustion.
  c. Deepwater or cold environment wells—production of fluids from a formation deeper in the well transfers heat from deeper formations up through the entire well as production occurs. In arctic wells, the shallow soil temperature may be below freezing (32° F. or 0° C.) while temperatures at the bottom of the wellbore may exceed the boiling point of water (212° F. or 100° C.). As warm fluids are produced, the shallow sediments warm up. Similarly, in deep water wells the temperature at the sea floor may be 40° F. (4° C.), but during production, the temperature in the shallow sediments just below the seafloor may be warmed to 200° F. (90° C.) depending upon production rate, time and temperatures of the producing formation. Finally, deep wells with high temperatures may heat the entire casing of the well to temperatures approaching the temperature of the producing formations. In some gas wells, for example, the ambient temperature around the wellhead is between 60° F. and 100° F. (15° C. and 40° C.) depending upon the season. However, the wellhead temperature during production is between 250° F. and 325° F. (120° C. and 160° C.) depending upon well depth, production rate, and time.

The well fluids modified with adhesive thermoplastic resins are helpful in isolation of exposed formations in the wellbore, sealing leaks between cement and borehole wall, cement and casing(s), or leaks in casing connections. In the first embodiment of the invention the adhesive thermoplastic materials are added to drilling fluids to form well fluids that also seal. Any drilling fluid not removed by the cement during cementing would form a sealant to prevent flow through channels resulting from the unremoved drilling fluid.

In another embodiment the thermoplastic materials are added to the cement slurry used to cement a well. The thermoplastic melts after placement, seals stress cracks in the cement, improves bond to the formation and well casings, and seals microannulus between cement and casing or cement and formation.

In another embodiment the adhesive thermoplastic materials are added to drilling fluids or spotting fluids placed in the wellbore prior to running casing and/or cementing. Any drilling fluid not removed by the cement during cementing would form a sealant to prevent flow through channels resulting from the unremoved drilling fluid.

In another embodiment the adhesive thermoplastic material is applied on the outside of the casing string or, for example, on the equipment, and hardware. A coating of adhesive thermoplastic resin can be sprayed onto the outside of the pipe(s) prior to placement in the well. The thermoplastic resin may be mixed with a compound such as toluene to form a paste that can be spread onto the equipment. The adhesive thermoplastic may also be applied as sheets or bands around the pipe prior to installation in the well. Hardware, such as, for example, spacers, centralizers, banding rings, etc. may be sprayed with, coated with, or made in part of adhesive thermoplastic resin and incorporated into the casing(s) prior to running into the well. Connections of the casing or sealing surfaces of wellhead or downhole equipment may be sprayed with, coated with, or made in part of adhesive thermoplastic materials prior to installation in the well or installation of casings.

Those of skill in the art will appreciate that many modifications and variations are possible in terms of the disclosed embodiments, configurations, materials, and methods without departing from their spirit and scope. Accordingly, the scope of the claims appended hereafter and their functional equivalents should not be limited by particular embodiments described and illustrated herein, as these are merely exemplary in nature and elements described separately may be optionally combined.

The following examples will serve to illustrate the invention disclosed herein. The examples are intended only as a means of illustration and should not be construed as limiting the scope of the invention in any way. Those skilled in the art will recognize many variations that may be made without departing from the spirit of the disclosed invention.

Example 1

Compatibility with Cement

A cement slurry was prepared using 800 grams API Class H Portland Cement, 40 grams ACLyn 540, 4 grams high temperature lignosulfonate retarder, and 320 grams distilled water. The slurry was sheared in a consistometer while heating from 24° C. (75° F.) to 102° C. (215° F.) in 44 minutes. Pressure on the slurry was increased from 68.9 bar (1000 psi) to 965.3 bar (14,000 psi) during heating. The slurry was sheared until the cement set. No premature gellation was observed during the test and the resulting mass was a cohesive solid.

Example 2

Increasing Cement Ductility 400 grams of API Class H Portland Cement and 400 grams ACLyn 580 were combined with 4 grams of high temperature lignosulfonate retarder and 320 grams distilled water. The slurry was sheared in a consistometer while heating from 24° C. (75° F.) to 149° C. (300° F.) in 60 minutes. Pressure on the slurry was increased from 68.9 bar (1000 psi) to 965.3 bar (14,000 psi) during heating. The slurry was sheared until the cement set. The resulting mass was soft and flexible and not set as firmly as the mixture of Example 1. A portion of the copolymer separated near the top of the slurry and set into a strong, flexible mass having flexibility of a plastic card, such as a credit card. Microscopic examination of the flexible mass showed no permeability in the matrix and the cement and copolymer combined to form a composite, fiber-reinforced matrix.

Example 3

Improving Interfacial Sealing Between Cement and Pipe

A cement slurry was prepared using 800 grams API Class H Portland Cement, 80 grams ACLyn 580, 4 grams high temperature lignosulfonate retarder, and 320 grams distilled water. The slurry was placed in a U-shaped pipe and placed in an oven set to a temperature below the melting point of the ACLyn 580 copolymer. The cement was allowed to set undisturbed at a temperature below the melting point of the ACLyn 580 copolymer. After the cement set, a differential pressure of 50 psi (3.45 bar) was created with nitrogen gas across the two legs of the U-tube. Nitrogen gas leaked between the two legs of the U-tube at a rate in excess of $1 \times 10^{-3}$ cc/psi-minute.

The temperature of the oven was increased to a temperature 10° F. (5.55° C.) below the melting temperature of the ACLyn 580 copolymer and a differential pressure of 50 psi (3.45 bar) was created with nitrogen gas across the two legs of the U-tube. Nitrogen gas leaked between the two legs of the U-tube at a rate in excess of $5 \times 10^{-3}$ cc/psi-minute. The increased leakage rate of gas was believed to be due to the expansion of the metal U-tube with temperature.

The temperature of the oven was increased to a temperature 10° F. (5.55° C.) above the melting temperature of the ACLyn 580 copolymer and a differential pressure of 100 psi (6.9 bar) were created with nitrogen gas across the two legs of the U-tube. Nitrogen gas leaked between the two legs of the U-tube at a rate $3.5 \times 10^{-4}$ cc/psi-minute. The decreased leakage rate of gas was believed to be due to the melting and reaction of the copolymer with the metal U-tube.

The temperature of the oven was increased to a temperature 50° F. (27.8° C.) above the melting temperature of the ACLyn 580 copolymer and a differential pressure of 500 psi (34.45 bar) were created with nitrogen gas across the two legs of the U-tube. Nitrogen gas leaked between the two legs of the U-tube at a rate $2.2 \times 10^{-5}$ cc/psi-minute. The decreased leakage rate of gas was believed to be due to the melting and reaction of the copolymer with the metal U-tube.

Example 4

Incorporation into Pipe

A paste of ACLyn 580 and toluene was created by heating toluene, adding ACLyn 580, and stirring until a thick, translucent paste was formed. This paste was applied in a 2 inch wide band, approximately 1/16 inch thick to the inside of one leg of a U-tube. The paste was allowed to cool and then the U-tube was heated to 150° F. (66° C.) to evaporate excess solvent.

A cement slurry prepared with 800 grams API Class H Portland Cement and 320 grams distilled water was place in the U-tube. The U-tube was placed in an oven and both legs pressurized to 2000 psi (138 bar). The oven was heated to 125° F. 0 and the cement was allowed to set. After the cement set, a differential pressure of 50 psi (3.45 bar) was created with nitrogen gas across the two legs of the U-tube. Nitrogen gas leaked between the two legs of the U-tube at a rate in excess of $1 \times 10^{-3}$ cc/psi-minute The temperature of the oven was increased to a temperature 50° F. (27.8° C.) above the melting temperature of the ACLyn 580 copolymer and a differential pressure of 500 psi (34.5 bar) were created with nitrogen gas across the two legs of the U-tube. No nitrogen gas leaked between the two legs of the U-tube at this differential pressure. The differential pressure was increased to 1000 psi and no leakage of nitrogen was measured over a 30-minute period. The differential pressure was increased to 1500 psi (103 bar) and no leakage of nitrogen was measured over a 60-minute period.

Other embodiments of the invention will be apparent to those skilled in the art from a consideration of this specification or from practice of the invention disclosed.

Example 5

Effect on Poisson's Ratio and Young's Modulus

A cement slurry was prepared using varying amounts of ACLyn 580. The mixture was cured at 80° F. and 230° F. (27° C. and 110° C.) and a confining pressure of 3000 psi (207 bar) was applied. Young's Modulus and Poisson's Ratio were determined from data between 20-60% compressive strength. Table 1 shows the results. Table 2 shows the results in SI units The test revealed that increasing the amount of the copolymer makes the cement more ductile. When cured at a temperature below 80° F. (27° C.), the copolymer is an elastic filler. However, when cured at temperatures above the melting point of the copolymer, an ionomer is formed by the reaction of the functional groups on the copolymer with mono-, di-, and tr-valent alkali and transitional metal salts in the cement. This results in a more rubbery material with a much higher Poisson's ratio.

TABLE 1

| AC-540A Copolymer % wt | Sample Curing Temperature ° F. | Compressive Strength psi | Poisson Ratio | Elastic Modulus psi |
| --- | --- | --- | --- | --- |
| 0  | 80 F.  | 5,519 | 0.1359 | 1,200,000 |
| 10 | 80 F.  | 6,240 | 0.0923 | 414,000 |
| 20 | 80 F.  | 4,639 | 0.0661 | 210,000 |
| 30 | 80 F.  | 3,441 | 0.2403 | 114,000 |
| 0  | 230° F. | 5,743 | 0.1113 | 1,250,000 |
| 10 | 230° F. | 5,032 | 0.3224 | 936,000 |
| 20 | 230° F. | 3,423 | 0.4677 | 224,000 |
| 30 | 230° F. | 2,838 | 0.2948 | 154,000 |

TABLE 2

| AC-540A Copolymer % wt | Sample Curing Temperature ° C. | Compressive Strength bar | Poisson Ratio | Elastic Modulus bar |
| --- | --- | --- | --- | --- |
| 0  | 27  | 381 | 0.1359 | 82,740 |
| 10 | 27  | 430 | 0.0923 | 28,540 |
| 20 | 27  | 320 | 0.0661 | 14,480 |
| 30 | 27  | 237 | 0.2403 | 7,860 |
| 0  | 110 | 396 | 0.1113 | 86,180 |
| 10 | 110 | 347 | 0.3224 | 64,530 |
| 20 | 110 | 236 | 0.4677 | 15,540 |
| 30 | 110 | 196 | 0.2948 | 10,620 |

What is claimed is:

1. A method for improving sealing of pipe in a well, comprising:
   a) providing a wellbore;
   b) providing a pipe;
   c) coating an outside surface of the pipe with an adhesive thermoplastic material;
   d) running the coated pipe into the wellbore; and
   e) causing the temperature of said wellbore to increase to a temperature greater than a melting temperature of said adhesive thermoplastic rosin material.

2. The method of claim 1 wherein the adhesive thermoplastic material is a copolymer selected from the group consisting of ethylene-acrylic acid copolymers, ethylene-methacrylic acid copolymers, ethylene-vinyl acetate copolymers, ethylene-vinylphosphonic acid copolymers, ionomers or salts of acid forms of acidic copolymers, and combinations thereof.

3. The method of claim 2 wherein the ionomer or salt is of a metal selected from sodium, calcium, magnesium, and zinc.

4. The method of claim 1 wherein the adhesive thermoplastic material is a homopolymer selected from the group consisting of acrylic acid, methacrylic acid, vinyl phosphonic acid, ionomers or salts of acid forms thereof, and combinations thereof.

5. The method of claim 4 wherein the ionomer or salt is of a metal selected from sodium, calcium, magnesium, and zinc.

6. The method of claim 1 further comprising heating the well with hot injectants.

7. The method of claim 1 wherein the adhesive thermoplastic material melts between the circulating temperature of the wellbore and the undisturbed geothermal temperature of the well.

8. The method of claim 1 wherein the adhesive thermoplastic material melts between the undisturbed geothermal temperature of the well and the operating temperature of the well.

9. The method of claim 1 wherein the adhesive thermoplastic material is selected from a blend of polyethylene with a compound selected from the group consisting of acrylic, methacrylic, polyacrylic, polymethacrylic, vinyl phosphonic, polyvinylphosphonic acids, and ionomers and salts thereof, and combinations thereof.

10. The method of claim 1 wherein the adhesive thermoplastic material is in a form selected from the group consisting of powders, prills, pellets, pills, and dispersions.

* * * * *